June 2, 1953          P. D. BECKER          2,640,244
FASTENER ASSEMBLY
Filed June 27, 1951          2 Sheets—Sheet 1
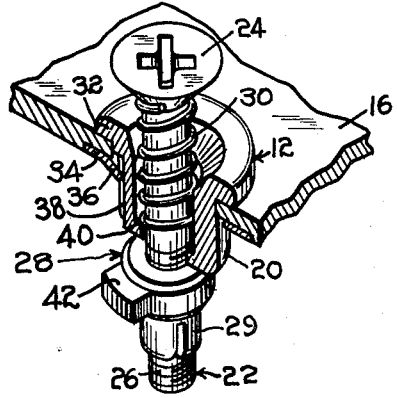
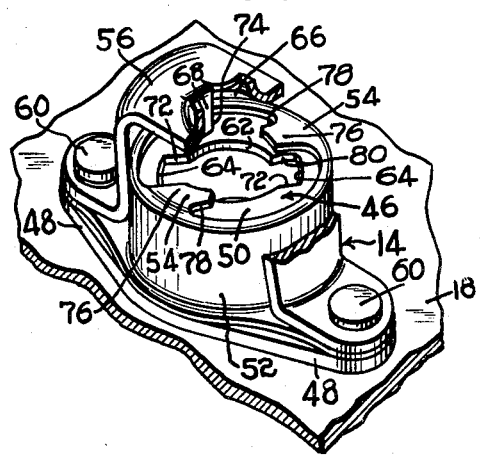
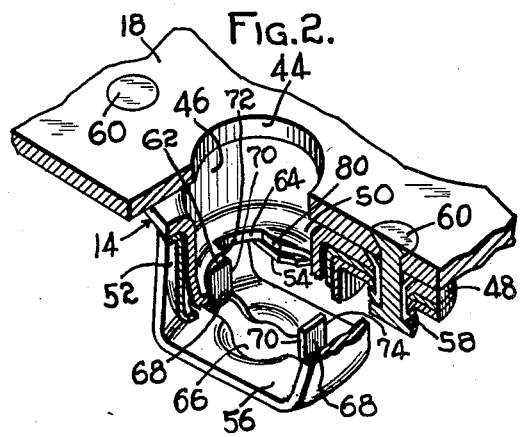
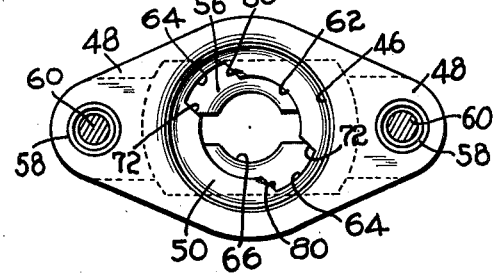
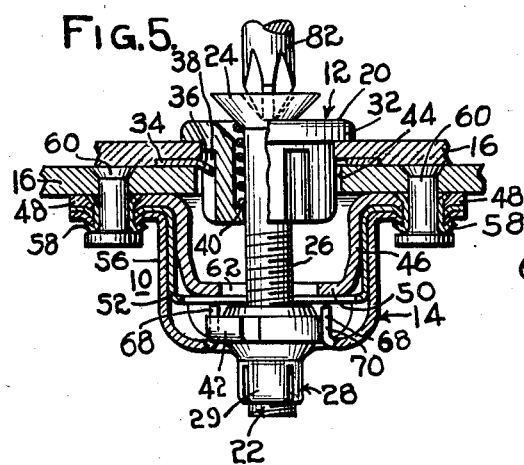
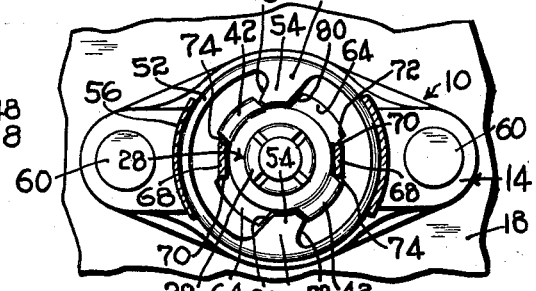
INVENTOR:
PHILIP D. BECKER,
By Robert E Ross
AGENT.

June 2, 1953  P. D. BECKER  2,640,244
FASTENER ASSEMBLY
Filed June 27, 1951
2 Sheets-Sheet 2

INVENTOR:
PHILIP D. BECKER,
BY Robert E. Ross
AGENT.

Patented June 2, 1953

2,640,244

UNITED STATES PATENT OFFICE 2,640,244

FASTENER ASSEMBLY

Philip D. Becker, Hingham, Mass., assignor to United-Carr Fastener Corporation, Cambridge, Mass., a corporation of Massachusetts Application June 27, 1951, Serial No. 233,909

10 Claims. (Cl. 24—221)

This invention relates generally to fastening devices, and has particular reference to a rotary operated fastening device for use in fastening superimposed panels and to resist shear forces applied thereto.

In the construction of aircraft for travel at extremely high speeds, it has been found desirable to design the airframe so that the outer sheet metal covering provides part of the structural strength thereof. Such sheet metal covering must necessarily be provided with panels to allow access to apparatus inside the airframe, and the panels must be capable of being rapidly removed and replaced. However, since the panels, when in place, provide a portion of the structural strength of the airframe, the panels must be provided with extremely strong and reliable fastening means for attachment to the main body of the airframe. This is particularly true in the case of aircraft designed to travel at speeds approaching the speed of sound, since at such speeds considerable shear stress may be produced between the panel and the main body of the airframe.

The object of the invention is to provide a fastening device for use in attaching superimposed panels, in which a bushing for assembly in an opening in one panel is adapted to protrude through an opening in the other panel to resist shear forces applied to the panels.

A further object of the invention is to provide a panel fastener in which a stud assembly for mounting in one panel is provided with a bolt with a friction lock nut disposed thereon for engaging a socket mounted in another panel, and the socket member is provided with bearing plate means having a nut-receiving opening therein to permit the nut to pass therethrough and be rotated into a fastening position, and means spaced from the bearing plate to limit the distance the nut can pass beyond the bearing plate.

A still further object of the invention is to provide a socket member for receiving a stud comprising a friction lock nut disposed on a bolt, in which the socket is provided with a bearing plate and a saddle member spaced from the bearing plate to form a nut-receiving space therebetween, and means disposed between the bearing plate and the saddle member to control the rotation of the nut in relation to the bolt.

In the drawing:

Fig. 1 is a perspective view, partly broken away, of a stud assembly for use in a fastener assembly embodying the features of the invention;

Fig. 2 is a perspective view, partly broken away, of a socket assembly for use with the stud assembly of Fig. 1;

Fig. 3 is a perspective view, partly broken away, of the socket assembly of Fig. 2 as seen from the bottom;

Fig. 4 is a top plan view of the socket member of Fig. 2;

Fig. 5 is a view in elevation, partly in section, of the stud and socket assembly in which the nut member of the stud has been inserted into the socket and rotated into a locking position;

Fig. 6 is a bottom plan view of Fig. 5 with the saddle member broken away;

Figure 7:
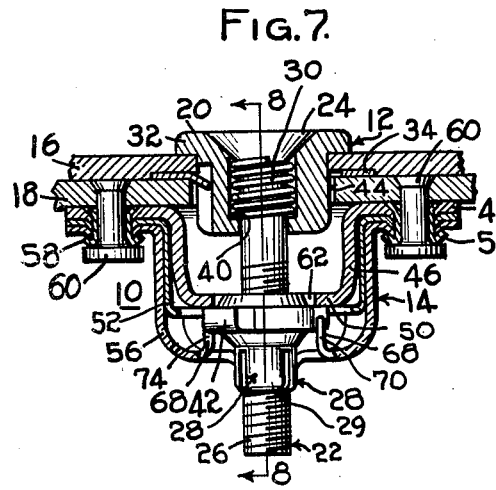
Fig. 7 is a view in elevation of the assembled stud and socket in which the nut of the stud has been tightened against the bearing plate of the socket to draw the plates tightly together.

Referring to the drawing, there is illustrated a panel fastener 10, comprising a stud assembly 12 and a socket assembly 14 which are adapted for assembly onto panels 16 and 18 which are to be superimposed, to fasten the panels together and to resist shear forces applied thereto.

The stud assembly 12 comprises a bushing 20 assembled into an opening in the panel 16, a bolt 22 extending through the bushing and longitudinally movable therein, which has a head 24 disposed on one side thereof and a threaded portion 26 protruding from the other side, a nut 28 disposed on the bolt having an axially extending friction lock shank portion 29, and a spring 30 assembled on the bolt to urge the bolt upwardly in relation to the panel. The bushing 20 is provided with a retaining flange 32 for bearing against the upper side of the panel 16, and the bushing may be retained in assembly with the panel by any convenient means, such as a sheet metal retaining ring 34 having tongues 36 extending radially inwardly to enter grooves 38 in the wall of the bushing for inclined frictional engagement therewith. The bushing is also provided with an inner spring support flange 40, so that the spring is confined between said flange and the head 24 of the bolt, whereby the bolt is normally maintained in the raised position illustrated in Fig. 1, with the nut 28 bearing against the bottom of the bushing. The bushing 20 protrudes a considerable distance beneath the panel 16 for a purpose to be hereinafter described. The nut 28 is of the friction lock type, that is, the threads of the nut in the shank portion 29 engage the threads of the bolt in such a manner that a substantial torque is required to rotate the nut relative to the bolt, and consequently when the bolt is rotated, the nut will normally rotate with the bolt unless positive means is provided to prevent such rotation. The nut is also provided with a pair of bearing wings 42 which extend radially therefrom for a purpose to be hereinafter described.

The socket assembly 14 is adapted to be assembled onto the lower side of the lower panel 18 opposite an opening 44 therein, and comprises generally a hollow receptacle 46 having a bearing portion 50 at the end thereof spaced from the panel 18 and laterally extending panel attaching portions 48, a sheet metal body 52 assembled about the receptacle having intermediate nut stop tongues 54 extending radially inwardly under the receptacle for a purpose to be hereinafter described, and a saddle member 56 disposed under the receptacle in spaced relation to the bearing portion 50. The receptacle, the sheet metal body 52, and the saddle are preferably preassembled by means of hollow eyelets 58, and the assembly is then mounted onto the panel by means of rivets 60 extending through the eyelets.

The receptacle is preferably formed of relatively heavy sheet metal to resist stresses to be applied thereto when the fastener is assembled. The bearing portion 50 is provided with an opening 62 for receiving the nut, and the opening has radially extending slot portions 64 to permit the wings of the nut to pass therethrough when the bolt is in a predetermined rotational position in relation to the bearing portion.

The saddle member 56 is provided with an opening 66 which is aligned with the opening 62, to receive the end of the bolt and the shank 29 of the nut when the bolt is inserted into the socket, to maintain the bolt in a vertical position in relation to the socket. The saddle is spaced from the bearing portion of the receptacle a sufficient distance to permit the wings of the nut to rotate therebetween; and to control such rotation in a manner to be hereinafter described, a pair of tabs 68 are provided which extend from the saddle toward the bearing portion of the receptacle, for engagement with the wings of the nut during rotation thereof. The tabs have a side 70 providing a nut loosening stop which is disposed directly beneath an edge 72 of the slot portions 64 of the receptacle opening 62, and a side 74 providing a nut tightening stop which is disposed below the bearing portion 50. The tabs 68 are disposed directly opposite each other on opposite sides of the opening 66, so that during rotation of the nut between the saddle and the bearing plate, the wings of the nut contact corresponding sides of the tabs 68 simultaneously to stop the rotation thereof. The intermediate tongues 54 each have an inclined camming surface 76 leading to an edge 78 which is spaced below the bearing portion 50 to provide an intermediate nut loosening stop, and the tongues are also positioned opposite one another so that during certain conditions of rotation of the nut, the wings of the nut will engage edges of the tongues simultaneously to stop the rotation thereof. The inclined surfaces 76 initiate below edges 80 of the slot portions in the receptacle, on the side of the slot portions opposite the nut loosening stop sides 70 of the tabs 68. The edges 78 of the tongues 54 are spaced radially from the nut tightening stop sides 74 of the tabs a sufficient distance to allow the wings 42 of the nut to seat therebetween against the bearing portion of the receptacle. The edges 78 of the tongues 54 are each spaced a predetermined distance from the bearing portion 50 of the receptacle to insure that the edges thereof will engage the nut wings 42 during the operation of the fastener, but said edges 78 are spaced from the saddle a sufficient distance to permit the nut wings to pass therebetween.

Figure 12:
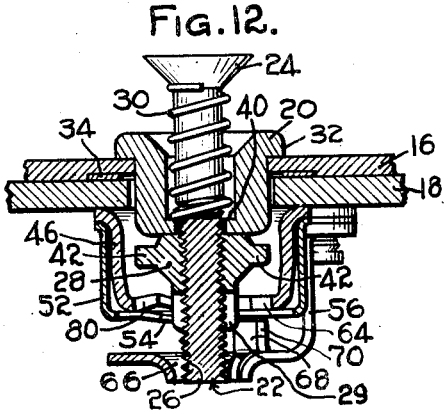
Fig. 12 is a view in section taken on line 12—12 of Fig. 11, in which the nut has moved through the bearing plate opening to disengage the stud assembly from the socket assembly.

To assemble the panels by means of the illustrated fastener, the panels are superimposed so that the bushing 20 enters the opening 44 in the lower panel and protrudes therefrom into the receptacle 46. The depth of the receptacle allows the panels to come together even though the nut 28 has not yet passed through the opening 62 (see Fig. 12). The bolt 22 is then rotated by means of a screwdriver or other tool, until the nut wings are aligned with the slot portions 64 of the opening, and a downward pressure on the tool 82 causes the bolt to move downwardly through the bushing, compressing the spring 30 and causing the nut to pass through the opening 62. As the bolt moves downwardly, the shank 29 of the nut passes into the opening 66 in the saddle, so that the bolt is maintained in a vertical position in the socket assembly, and the nut 28 contacts the saddle to limit the distance the nut can pass beyond the bearing portion 50 of the receptacle. Rotation of the bolt in a clockwise direction (as seen from above) will cause the nut to rotate with the bolt so that the wings 42 pass between the tongue 54 and the saddle and come into contact with the nut tightening stop sides 74 of the tabs 68 (see Figs. 5 and 6). It is apparent that before such assembly can be accomplished, the nut 28 must initially be far enough down on the bolt to allow the wings thereof to pass the tongues 54 during rotation of the nut. However, after the first assembly and disassembly of the stud and socket, the nut will automatically assume this position, in a manner to be hereinafter described. After the wings have engaged the nut tightening sides 74 of the tabs 68, further rotation of the nut in a clockwise direction is impossible, consequently, further rotation of the bolt in a clockwise direction will cause the nut to draw up on the bolt and bear against the bearing portion 50 of the receptacle between the tongues 54 and the tabs 68, thereby drawing the two panels 12 and 14 tightly together (see Fig. 7).

Figure 10:
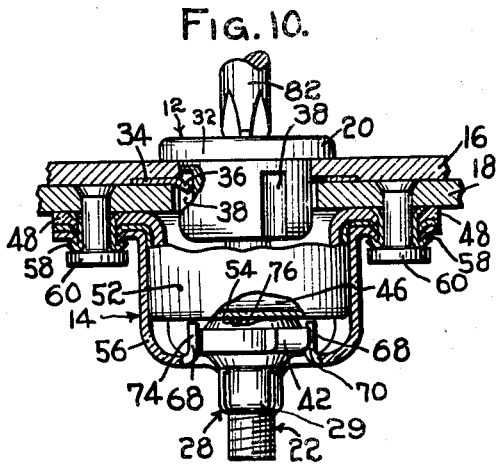
Fig. 10 is a view in elevation, partly in section, of the stud and socket assembly in which the nut has been loosened sufficiently to rotate with the bolt so that the bearing wings are in position to pass through the opening in the bearing plate.
Figure 8:
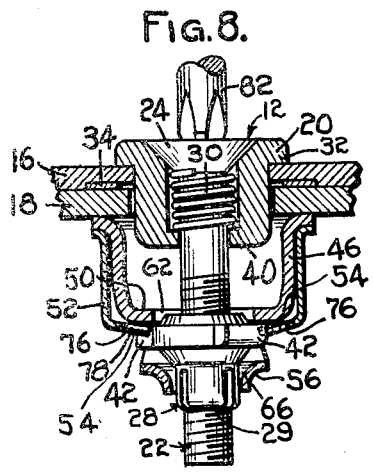
Fig. 8 is a view in section taken on line 8—8 of Fig. 7 in which the bolt has been rotated in a direction to loosen the nut from the bearing plate.
Figure 11:
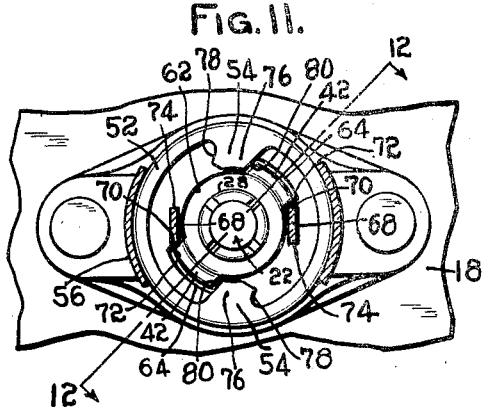
Fig. 11 is a bottom plan view of Fig. 10 with the saddle member broken away.
Figure 9:
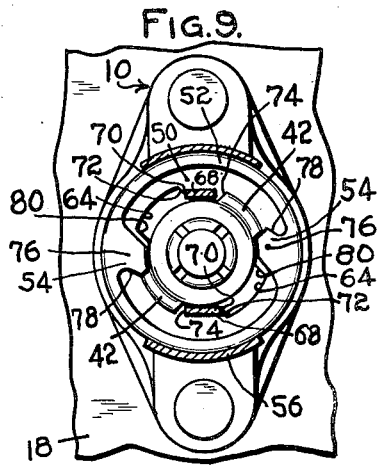
Fig. 9 is a bottom plan view of Fig. 8 with the saddle member broken away.

To disassemble the fastener, the bolt is rotated in the opposite, or counterclockwise direction. Since the nut is held tightly against the bearing portion of the receptacle, such rotation of the bolt will at first cause no rotation of the nut. However, after the rotation of the bolt has loosened the nut, further rotation of the bolt will tend to cause the nut to turn with the bolt in a counterclockwise direction. However, the nut is prevented from turning any substantial amount by the edges 78 on the tongues 54 (see Figs. 8 and 9). Hence, further counterclockwise rotation of the bolt will cause the nut to back off the bolt until it is far enough down the bolt for the wings to clear the tongues and pass between said tongues and the saddle. Thereafter the wings are free to rotate in a counterclockwise direction until they contact the nut loosening stop side 70 of the tabs 54, which prevents further rotation of the nut in the counterclockwise direction (see Figs. 10 and 11). When the nut has reached this position the pressure of the tool may be released and the spring 30 will lift the bolt so that the nut passes upwardly through the opening 62 in the receptacle, thereby completing the disengagement (see Fig. 12).

After one such operation of assembly and disassembly, the nut will be properly positioned on the bolt for subsequent assembly operations, since the intermediate tongues 54, during disassembly, require that the nut be positioned further down the bolt than is necessary for assembly, since during disassembly the wings of the nut must pass over the edges 78 of the tongues, but during assembly, the wings of the nut can ride over the camming surfaces 76. The tongues 54 are preferably slightly resilient to facilitate such operation. During subsequent assembly operations, if the nut is not far enough down the bolt for the wings to clear the tongues 54, when the bolt is rotated, such condition will be immediately evident when the pressure of the tool is released, since the head of the bolt will then pop back out of the bushing. When this occurs, the nut may be backed further off the bolt by forcing the nut through the opening 62 and rotating the bolt in a counterclockwise direction.

Since the bushing 20 extends through both plates, the fastener is capable of resisting high shear stresses therebetween. The fastener also has the advantage of being capable of fastening plates which have been sprung out of shape, since a warped portion of a plate may be drawn down by tightening the bolt after the fastener is engaged, whereas other types of fasteners require that the plate be initially forced down to allow the parts of the fastener to be engaged.

Since certain obvious modifications may be made in the device without departing from the scope of the invention, it is intended that all matter contained herein be interpreted in an illustrative and not in a limiting sense.

I claim:

1. A panel fastener comprising a stud assembly and a socket assembly for mounting on opposing portions of superimposed panels; said stud assembly comprising bolt means for assembly into an opening in one panel, a friction lock nut disposed on the bolt, said nut having laterally extending bearing wings; said socket assembly comprising a bearing plate for attachment to the other panel opposite an opening therein, said bearing plate having an opening to receive the bolt and the nut, said opening having radially extending slot portions to allow the bearing wings of the nut to pass therethrough when the nut is in a predetermined rotational position relative to the bearing plate, whereby when the bolt and the nut are inserted through the bearing plate opening and rotated, the wings of the nut pass behind the bearing plate; a saddle member disposed opposite the bearing plate in spaced relation thereto and having an opening to receive the end of the bolt when the bolt and the nut are inserted through the bearing plate opening, said saddle providing a bearing surface for the wings of the nut to limit the distance the nut can pass beyond the bearing plate and being spaced from the bearing plate a sufficient distance to allow rotation of the wings of the nut therebetween, nut-tightening stop means disposed between the saddle and the bearing plate to engage the nut wings after the nut has been inserted into the bearing plate opening and rotated until the wings are behind the bearing plate, whereby further rotation of the bolt causes the nut to draw up on the bolt so that the nut wings bear tightly against the bearing plate, and nut-loosening stop means disposed between the bearing plate and the saddle to engage the wings of the nut when the bolt has been rotated to loosen the nut sufficiently that the nut rotates with the bolt, said nut-loosening stop means being positioned in relation to the bearing plate so as to stop the rotation of the nut during loosening with the nut wings in position to pass through the bearing plate opening.

2. A panel fastener comprising a stud assembly and a socket assembly for mounting on panels opposing portions of which are to be superimposed, to fasten the panels together, said stud assembly comprising a bushing for assembly into an opening in one panel, a bolt extending through the bushing having a head disposed on one side thereof and a threaded portion disposed on the other side, said bolt being longitudinally movable in the bushing, a friction lock nut disposed on the threaded portion, said nut having laterally extending bearing wings, and spring means associated with the bolt to urge the bolt longitudinally in the bushing so that the head of the nut normally protrudes from the bushing; said socket assembly comprising a bearing plate for attachment to the other panel opposite an opening therein, said bearing plate having an opening to allow the bolt and the nut to pass therethrough, said opening having radially extending slots to allow the bearing wings of the nut to pass therethrough when the nut is in a predetermined rotational position relative to the bearing plate, whereby when the bolt and the nut are inserted through the bearing plate opening and then rotated in one direction the wings of the nut pass behind the bearing plate, a saddle member disposed opposite the bearing plate in spaced relation thereto, said saddle having an opening to receive the end of the bolt when the bolt and the nut are inserted into the bearing plate opening, and providing a bearing surface for the wings of the nut to limit the distance the nut can pass beyond the bearing plate, said saddle member being spaced from the bearing plate a sufficient distance to permit rotation of the nut therebetween, nut-tightening stop means disposed between said saddle and said bearing plate to engage the nut wings after the nut has been rotated in said one direction so that the wings are behind the bearing plate, whereby further rotation of the bolt in said one direction causes the nut to draw up on the bolt so that the nut wings bear tightly against the bearing plate, and nut-loosening stop means disposed between the saddle and the bearing plate to engage the wings of the nut when the bolt has been rotated in the other direction so as to loosen the wings enough to cause rotation of the nut away from the first stop means, said nut-loosening stop means being positioned so as to stop the rotation of the nut in a predetermined position so that the wings are positioned to pass back through the bearing plate opening.

3. A panel fastener comprising a stud assembly and a socket assembly for mounting on a pair of panels which are to be superimposed, to fasten the panels together and to resist shear forces applied thereto; said stud assembly comprising a bushing for assembly into an opening in the upper panel, said bushing being adapted to protrude from the lower side of said upper panel, a bolt disposed through the bushing and movable longitudinally therein, said bolt having a head disposed on the upper side of the bushing and a threaded portion protruding from the lower side thereof, a friction lock nut disposed on the threaded portion below the bushing, said friction lock nut having radially extending bearing wings, and a spring member disposed about the bolt between the head and the bushing to urge the bolt upwardly; said socket assembly comprising a hollow receptacle for assembly onto the lower side of the lower panel opposite an opening therein, said receptacle being adapted to receive the protruding portion of the bushing when the plates are superimposed to resist shear forces applied to the panels, said receptacle having a bearing portion spaced from the lower panel, said bearing portion having an opening therein to receive the end of the bolt, said opening having radial slot portions to allow the nut to pass therethrough when the wings of the nut are in a predetermined rotational position in relation to the bearing portion, whereby the end of the bolt and the nut may be passed through the openings and rotated so that the wings of the nut pass behind the bearing portion, a saddle member disposed below said receptacle in spaced relation thereto, said saddle having an opening therein to receive the end of the bolt and providing a bearing surface for the nut wings to limit the distance the nut can pass beyond the bearing portion of the receptacle, said saddle being spaced from the bearing portion a distance sufficient to allow the wings of the nut to rotate therebetween, nut-tightening stop means disposed between the saddle and the bearing plate to engage the nut wings after the nut has been rotated in one direction to position the wings behind the bearing plate, whereby further rotation of the bolt in said direction causes the nut to draw up on the bolt so that the wings engage the bearing plate and draw the panels together, nut-loosening stop means disposed between the saddle and the bearing plate to engage the wings of the nut and stop the rotation thereof when the bolt is rotated in the opposite direction enough to loosen the nut from bearing against the bearing plate so that the nut rotates with the bolt, said nut-loosening stop means being positioned to stop the wings of the nut in a predetermined position so that the wings are positioned to pass upwardly through the opening in the bearing plate.

4. A panel fastener as set forth in claim 1 in which intermediate stop means is provided between the saddle and the bearing plate of the socket, said intermediate stop means being disposed between the radial slot portions of the opening in the bearing plate and the nut-tightening stop means and being spaced from the bearing plate, whereby during rotation of the bolt to loosen the nut, the nut must be loosened sufficiently to permit the wings of the nut to pass between the intermediate stop means and the saddle before the nut can rotate with the bolt to engage said nut-loosening stop means.

5. A panel fastener as set forth in claim 1 in which said nut-tightening stop means and said nut-loosening stop means are provided by opposite edges of a tab member extending from said saddle member toward the bearing plate.

6. A panel fastener as set forth in claim 1 in which said friction lock nut is provided with a lower shank portion, and the opening in the saddle member is adapted to receive said shank to position the assembled nut and bolt in the socket.

7. A socket assembly for mounting on a panel opposite an opening therein to receive a stud of the type having a threaded bolt and a friction lock nut disposed thereon with laterally extending wings; said socket comprising a bearing plate with an opening to receive the threaded member, said opening having radial slot portions to allow the wings of the nut to pass therethrough when the nut is in a predetermined rotational position in relation to the bearing plate, a saddle member disposed over the bearing plate in spaced relation thereto, said saddle member having an opening disposed opposite the bearing plate opening to receive the end of the bolt and to provide a bearing surface for the nut wings to limit the distance the nut may pass beyond the bearing plate, said saddle being spaced from the bearing plate far enough to permit rotation of the nut wings therebetween, nut-tightening stop means disposed between the saddle and the bearing plate to engage the nut wings and prevent further rotation of the nut after the wings have been rotated in one direction so that they are behind the bearing plate, whereby further rotation of the bolt in said one direction causes the nut to draw up thereon against the bearing plate, and nut-loosening stop means disposed between the bearing plate and the saddle to engage the wings of the nut and stop the rotation thereof when the bolt has been rotated in the opposite direction to loosen the nut sufficiently that the nut rotates with the bolt, said nut-loosening stop means being positioned in relation to the bearing plate to stop the rotation of the nut in said opposite direction during loosening so that the wings of the nut are in position to pass through the radial slot portions of the bearing plate opening.

8. A socket assembly for mounting on a panel opposite an opening therein to receive a stud of the type having a threaded bolt assembled through an opening in another panel and a friction lock nut disposed thereon with a pair of laterally extending bearing wings; said socket comprising a hollow receptacle for assembly onto the panel, said receptacle having a bearing portion spaced from the panel, with an opening therein to receive the end of the bolt, said opening having a pair of laterally extending slot portions to allow the wings of the nut to pass therethrough when the wings of the nut are in a predetermined rotational position in relation to the bearing portion, whereby the end of the bolt and the nut may be passed through the bearing plate opening and rotated so that the wings of the nut pass behind the bearing plate, a saddle member disposed in spaced relation to the bearing plate, said saddle member having an opening to receive the end of the bolt, and providing a bearing surface about the opening for the wings of the nut to limit the distance the nut can pass beyond the bearing portion of the receptacle, said saddle being spaced from the bearing plate a distance sufficient to permit the wings of the nut to rotate therebetween, nut-tightening stop means disposed between the saddle and the bearing plate to engage the nut wings and stop the rotation thereof after the nut has been rotated in one direction to position the wings behind the bearing plate, whereby further rotation of the bolt in said direction causes the nut to draw up on the bolt so that the wings engage the bearing plate and draw the panels together, nut-loosening stop means disposed between the saddle and the bearing plate to engage the wings of the nut and stop the rotation thereof when the bolt is rotated in the opposite direction enough to loosen the nut from bearing against the bearing plate so that the nut rotates with the bolt, said nut-loosening stop means being positioned in relation to the bearing plate to stop the rotation of said wings in said opposite direction when the wings are in position to pass back through the opening in the bearing plate.

9. A socket assembly as set forth in claim 7 in which intermediate stop means is provided between the saddle and the bearing plate, said intermediate stop means being disposed between the radial slot portions and the nut-tightening stop means, and being spaced from the bearing plate, whereby during rotation of the bolt to loosen the nut from the bearing plate, the nut must be loosened on the bolt sufficiently to permit the wings of the nut to pass between said intermediate stop means and the saddle before the nut can rotate with the bolt to engage said nut-loosening stop means.

10. A socket assembly as set forth in claim 7 in which said nut-tightening stop means and said nut-loosening stop means are provided by opposite edges of a tab member extending from the saddle member toward the bearing plate.

PHILIP D. BECKER.

References Cited in the file of this patent

UNITED STATES PATENTS

| Number | Name | Date |
|---|---|---|
| 2,372,496 | Huelster | Mar. 27, 1945 |
| 2,385,180 | Allen | Sept. 18, 1945 |